United States Patent
Ooi et al.

(10) Patent No.: US 12,464,207 B2
(45) Date of Patent: Nov. 4, 2025

(54) IMAGE SENSOR WITH AN INTEGRATED INFRARED CUT-OFF FILTER

(71) Applicant: MOTOROLA SOLUTIONS, INC., Chicago, IL (US)

(72) Inventors: Boon Teong Ooi, Penang (MY); Kwang Chun Oh, Penang (MY); Jin Hoe Phua, Penang (MY); Leslie Kok Lik Toh, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 506 days.

(21) Appl. No.: 18/147,652

(22) Filed: Dec. 28, 2022

(65) Prior Publication Data

US 2024/0223874 A1 Jul. 4, 2024

(51) Int. Cl.
*H04N 23/11* (2023.01)
*G02B 27/42* (2006.01)
(Continued)

(52) U.S. Cl.
CPC .......... *H04N 23/11* (2023.01); *G06V 10/143* (2022.01); *G06V 10/761* (2022.01); *H04N 1/60* (2013.01);
(Continued)

(58) Field of Classification Search
CPC .......... H04N 23/11; H04N 1/60; H04N 23/55; H04N 23/667; H04N 5/33; H04N 23/12; H04N 23/71; H04N 23/74; H04N 25/706; G06V 10/143; G06V 10/761; G02B 27/4294
See application file for complete search history.

(56) References Cited

U.S. PATENT DOCUMENTS 7,149,008 B2   12/2006  Kuo
8,035,069 B2 * 10/2011  Toda .................... H04N 25/131
                                               250/339.05
(Continued)

FOREIGN PATENT DOCUMENTS

EP   3399289 A1    11/2018
KR   101244147 B1   3/2013

OTHER PUBLICATIONS

Pamula, et al., "Mechanisms for Switchable Infrared Cut Filtering of Large Format Image Sensors," Motorola Solutions, Inc., 2019 (4 pages).

(Continued)

*Primary Examiner* — Thomas K Pham
*Assistant Examiner* — Ruby L Kauffman
(74) *Attorney, Agent, or Firm* — Michael Best & Friedrich LLP

(57) ABSTRACT

Imaging systems with an integrated infrared cut off filter and methods for operating same. One example system includes an image sensor and an electronic processor coupled to the image sensor. The image sensor includes a plurality of image recording pixels and a plurality of reserved pixels. A subset of the plurality of reserved pixels are covered by an infrared cut-off filter. The electronic processor is configured to determine a first visible light intensity for the subset of the plurality of reserved pixels. The electronic processor is further configured to control the image sensor to operate in one of a day mode and a night mode based on the first visible light intensity.

16 Claims, 5 Drawing Sheets

(51) Int. Cl.
*G06V 10/143* (2022.01)
*G06V 10/74* (2022.01)
*H04N 1/60* (2006.01)
*H04N 23/55* (2023.01)
*H04N 23/667* (2023.01)

(52) U.S. Cl.
CPC .......... *H04N 23/55* (2023.01); *H04N 23/667* (2023.01); *G02B 27/4294* (2013.01)

(56) References Cited

U.S. PATENT DOCUMENTS

| | | |
|---|---|---|
| 8,533,405 B2 | 9/2013 | Kim et al. |
| 8,779,345 B2 | 7/2014 | Mahowald |
| 9,781,361 B2 * | 10/2017 | Taylor .................. H04N 25/706 |
| 10,419,588 B2 * | 9/2019 | Zhou ....................... H04N 23/57 |
| 2007/0023661 A1 | 2/2007 | Wagner et al. |
| 2012/0092541 A1 | 4/2012 | Tuulos et al. |
| 2021/0084209 A1 * | 3/2021 | Kawasaki ............... G02B 5/208 |
| 2021/0099629 A1 * | 4/2021 | Zhou .................... H04N 25/702 |

OTHER PUBLICATIONS

International Search Report and Written Opinion for Application No. PCT/US2023/080588 dated Mar. 15, 2024 (11 pages).

* cited by examiner

IMAGE SENSOR WITH AN INTEGRATED INFRARED CUT-OFF FILTER

BACKGROUND OF THE INVENTION

Property owners, government agencies, and others deploy cameras for security, investigation, coordinating public safety responses, traffic monitoring, weather monitoring, and for other purposes. Some cameras are configured to operate in day and night modes, capturing images with the aid of infrared light at night and filtering infrared light from their images during the day.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1:
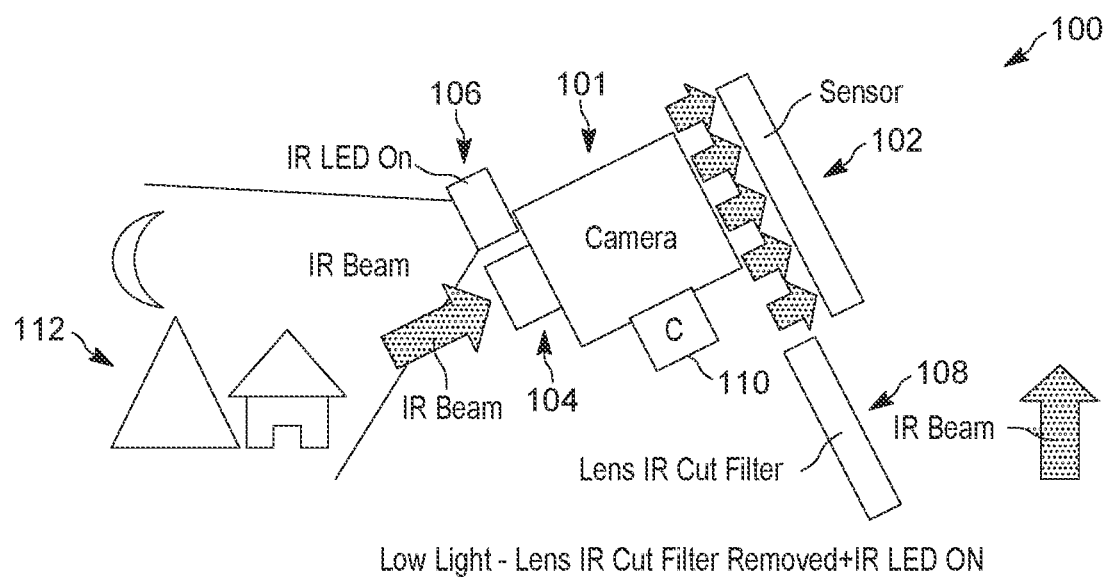
FIG. 1 illustrates an imaging system in accordance with some examples.
Figure 1:
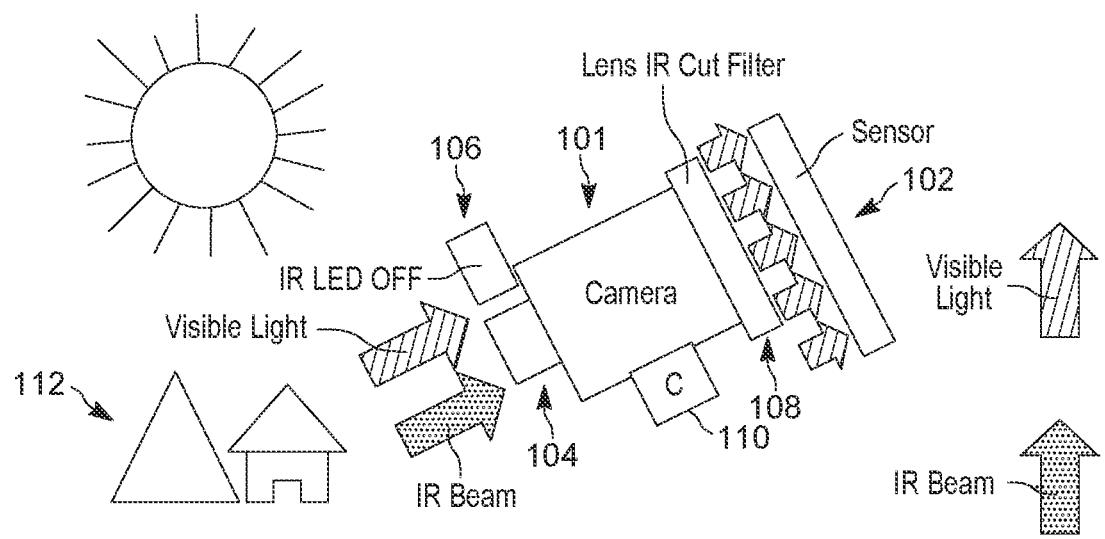

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION OF THE INVENTION

While security and other cameras operate during daylight hours, an infrared cut-off filter may be used to prevent infrared rays from entering the camera, improving image quality. However, to record images during low-light conditions (e.g., at night or in a darkened area), infrared rays are used to enhance image quality and the infrared cut-off filter should not be used.

Some cameras feature a switchable infrared cut-off filter, which can be moved to cover or uncover the camera's image sensor as needed. In other to determine the need for the infrared cut-off filter, such cameras will engage and disengage the infrared cut-off filter to produce two images. By comparing those images, the camera can determine whether to use the infrared cut-off filter. Because moving the infrared cut-off filter momentarily interrupts image capture, checks are only made periodically (e.g., every 30 minutes). However, this can result in a period of time where degraded images are captured. For example, if the ambient brightness level changes significantly during the time period, over or under exposed images may be captured.

To address, among other things, these technical problems with current infrared filtering technology in image capture systems, systems and methods are provided herein for operating image capture systems that includes image sensors with integrated infrared cut-off filters.

One example provides an imaging system. The system includes an image sensor and an electronic processor coupled to the image sensor. The image sensor includes a plurality of image recording pixels and a plurality of reserved pixels. A subset of the plurality of reserved pixels are covered by an infrared cut-off filter. The electronic processor is configured to determine a first visible light intensity for the subset of the plurality of reserved pixels. The electronic processor is further configured to control the image sensor to operate in one of a day mode and a night mode based on the first visible light intensity.

Another example provides a method for operating an imaging system. The method includes determining a first visible light intensity for a subset of a plurality of reserved pixels of an image sensor, the subset of the plurality of reserved pixels being covered by an infrared cut-off filter. The method includes controlling the image sensor to operate in one of a day mode and a night mode based on the first visible light intensity.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should be understood that although certain figures presented herein illustrate hardware and software located within particular devices, these depictions are for illustrative purposes only. In some instances, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 2:
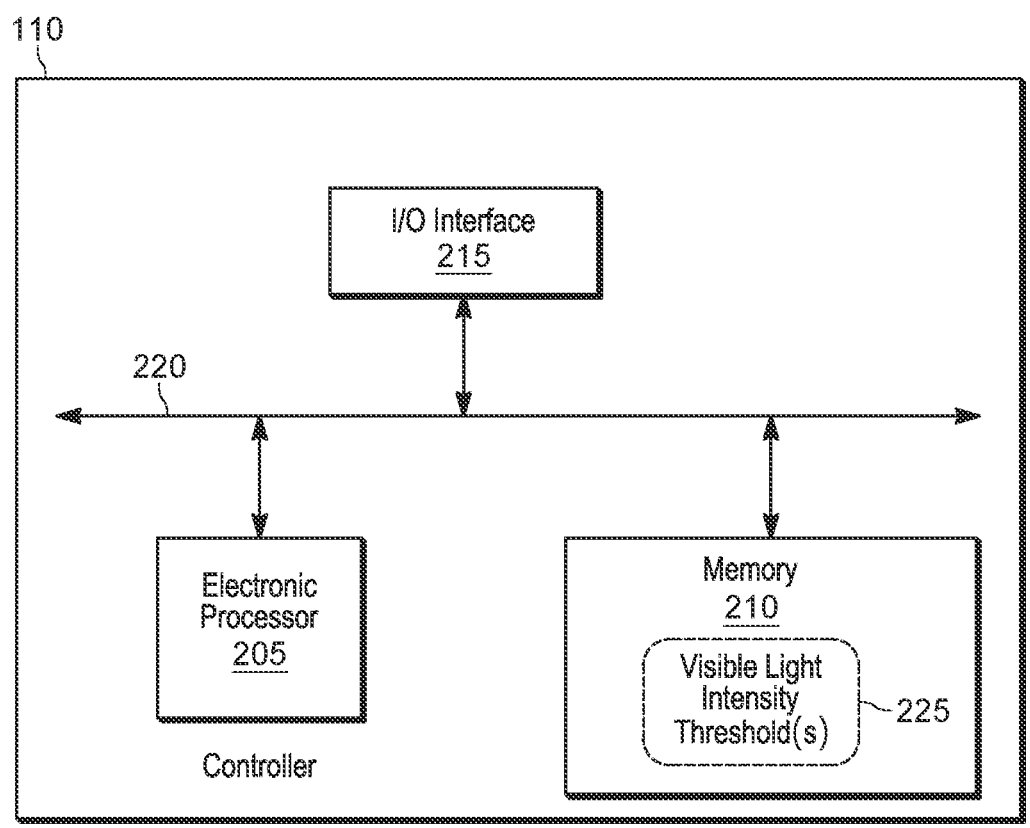
FIG. 2 schematically illustrates an electronic controller of the imaging system of FIG. 1 in accordance with some examples.

FIG. 1 is a diagram of an example imaging system 100. In the illustrated example, the system includes a camera 101. The camera 101 includes an image sensor 102 (e.g., a complementary metal-oxide-semiconductor (CMOS) active pixel sensor), a lens 104 for focusing light onto the image sensor 102, an infrared (IR) transmitter 106 (e.g., an IR light emitting diode), a deployable infrared cut-off filter 108, and an electronic controller 110. In some instances, the image sensor 102 is a CCD (charged coupled device) sensor or another suitable image sensor for sensing light in at least the visible and infrared portions of the electromagnetic spectrum. The electronic controller 110, described in detail with respect to FIG. 2, is communicatively coupled to components of the camera 101 and controls the camera 101 to capture images of an area 112, as described herein. The electronic controller 110 may be integrated with the camera 101 or may be separate from the camera 101 and coupled to the camera 101 via suitable wired or wireless connections.

The image sensor 102 and the camera 101 may be controlled (e.g., by the electronic controller 110) to operate in a night mode or a day mode. The night mode is used to record images during the night or while ambient visible light is greatly reduced. During the night mode, the image sensor 102 is configured to sense and output monochrome images. Infrared light makes it easier for the image sensor 102 to capture these images. Accordingly, the infrared transmitter 106 is activated to illuminate the area 112 with infrared light.

The day mode is used to record images during the day or while ambient visible light is sufficient. During the day mode, the image sensor 102 is configured to sense and output color images. While in day mode, infrared light (e.g., occurring in the environment or produced by the infrared transmitter 106) can compromise the quality of the images captured by the image sensor 102. Accordingly, the infrared transmitter 106 is deactivated during the day. In addition, the deployable infrared cut-off filter 108 may be used to improve image quality. The deployable infrared cut-off filter 108 is a filter that blocks or significantly prevents the transmission of infrared light, while allowing light in the visible spectrum to pass through.

The deployable infrared cut-off filter 108 is positionable in at least two positions, in a first position, the deployable infrared cut-off filter 108 covers the image sensor 102, reducing the amount of infrared light that reaches the image sensor 102. In the second position, the deployable infrared cut-off filter 108 does not cover the image sensor 102. In some instances, as illustrated in FIG. 1, the deployable infrared cut-off filter 108 is deployed in the first position during the day and deployed in the second position during the night. In this way, the infrared light produced by the infrared transmitter 106 is allowed to reach the image sensor 102 while in night mode and infrared light, from whatever source, is prevented from reaching the image sensor 102 while in day mode.

FIG. 2 illustrates an example of the electronic controller 110. In the illustrated example, the electronic controller 110 includes an electronic processor 205, a memory 210, and an input/output interface 215. The illustrated components, along with other various modules and components are coupled to each other by or through one or more control or data buses (e.g., the bus 220) that enable communication therebetween. The use of control and data buses for the interconnection between and exchange of information among the various modules and components would be apparent to a person skilled in the art in view of the description provided herein.

The electronic processor 205 obtains and provides information (e.g., from the memory 210 and/or the input/output interface 215), and processes the information by executing one or more software instructions or modules, capable of being stored, for example, in a random access memory ("RAM") area of the memory 210, a read only memory ("ROM") of the memory 210, or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to methods as described herein.

The memory 210 can include one or more non-transitory computer-readable media and includes a program storage area and a data storage area. In the embodiment illustrated, the memory 210 stores, among other things, one or more visible light intensity thresholds 225, described herein.

The input/output interface 215 is configured to receive input and to provide system output. The input/output interface 215 obtains information and signals from, and provides information and signals to, (e.g., over one or more wired and/or wireless connections) devices both internal and external to the electronic controller 110 (e.g., the infrared transmitter 106 and the deployable infrared cut-off filter 108).

As noted, in current systems, the switch between night mode and day mode is accomplished by periodically testing ambient light using the deployable infrared cut-off filter 108. However, such testing may result in momentary interruption in captured video or may cause overexposure or underexposure where there is a significant brightness change during a period between ambient light tests. To mitigate these problems, instances of the imaging system 100 are provided that include an image sensor 102 that includes an integrated infrared cut-off filter.

Figure 3:
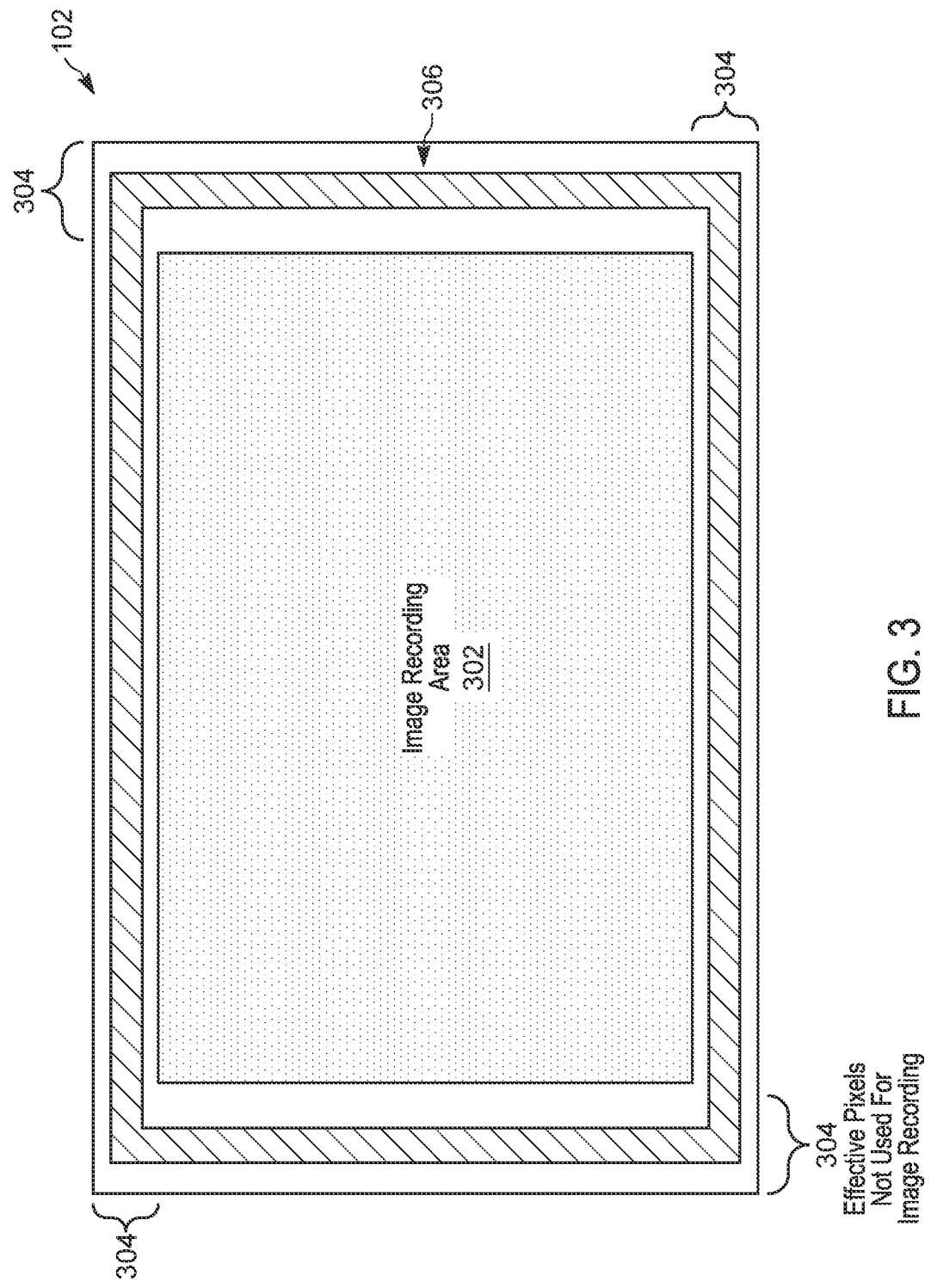
FIG. 3 illustrates an image sensor of the imaging system of FIG. 1 in accordance with some examples.

FIG. 3 illustrates an example of the image sensor 102. The image sensor 102 captures images using, among other things, pixels. Some pixels make up an image recording area 302 of the image sensor 102. The controller 110 uses those pixels to capture images (e.g., of the area 112). However, the image sensor 102 also includes pixels, that while effective for image capture, are not used for that purpose. These reserved pixels 304 remain unused or are used by the controller 110 for other purposes. For example, some of the reserved pixels 304 may be used for color correction, for example. In the example image sensor 102 illustrated in FIG. 3, some of the reserved pixels 304 are covered by an integrated infrared cut-off filter 306. As described herein, this allows the controller 110 to take infra-red filtered light intensity readings at any time, without the need to position the deployable infrared cut-off filter 108 and without interrupting image capture in the image recording area 302. In addition, the controller 110 is still able to use the remaining uncovered reserved pixels for color correction or other suitable purposes. In the illustrated example, the reserved pixels 304 do not overlap the image recording area 302. It should be noted that the example illustrated in FIG. 3 shows only one of many possible configurations of the sensor 102 and the integrated infrared cut-off filter 306.

Figure 4:
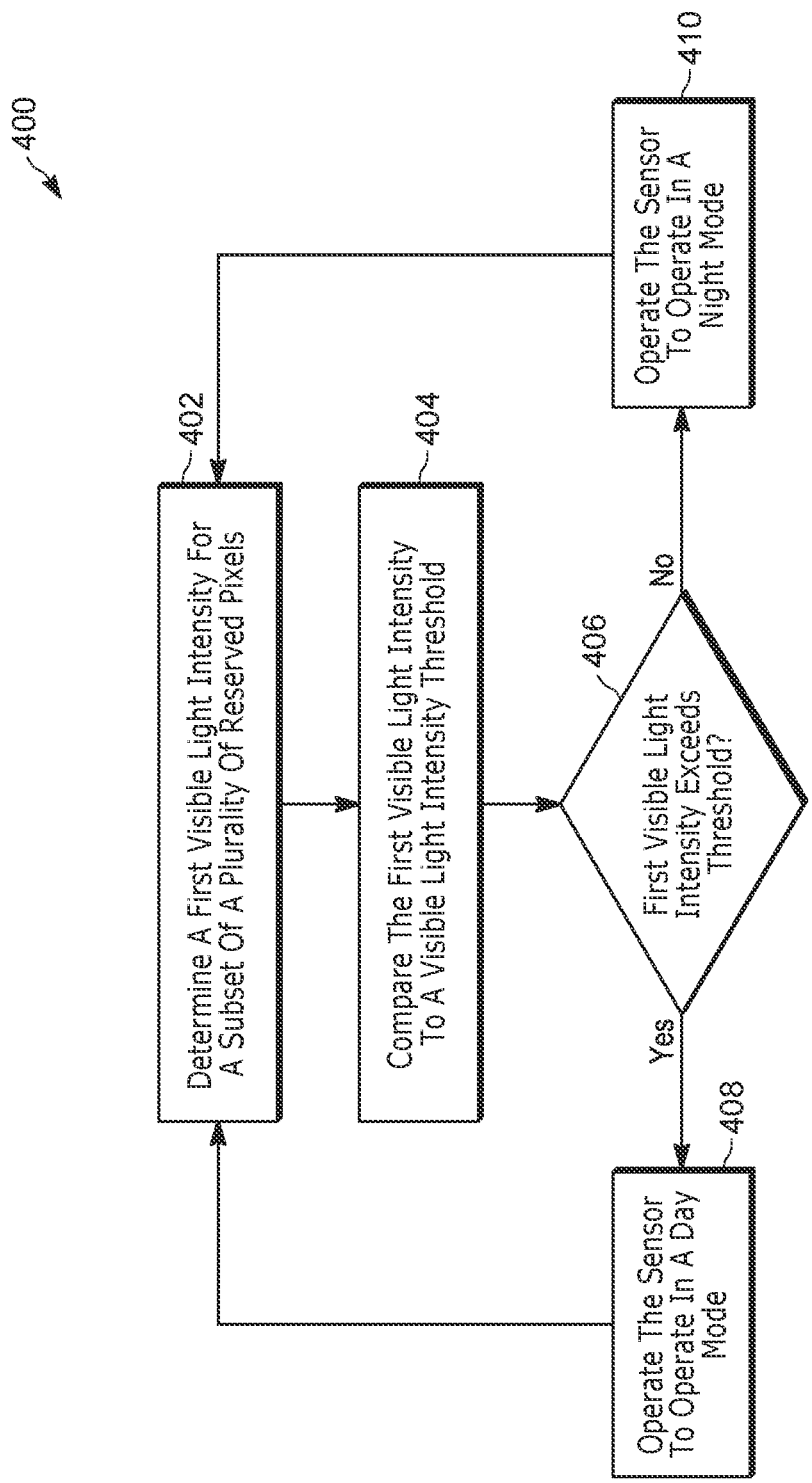
FIG. 4 is a flowchart illustrating a method for operating the system of FIG. 1 in accordance with some examples.

FIG. 4 illustrates an example method 400 for operating an imaging system that includes an integrated infrared cut-off filter, as described herein. Although the method 400 is described in conjunction with the system 100 as described herein, the method 400 could be used with other systems and devices. In addition, the method 400 may be modified or performed differently than the specific example provided.

As an example, the method 400 is described as being performed by the electronic controller 110 and, in particular, the electronic processor 205. However, it should be understood that, in some embodiments, portions of the method 400 may be performed by other devices, including for example, a remote computing device (not show), such as a computer server communicatively coupled to the camera 101. Additional electronic processors may also be included in the electronic controller 110 that perform all or a portion of the method 400. For ease of description, the method 400 is described in terms of a single image sensor and electronic controller. However, the method 400 may be applied to systems including multiple cameras and/or image sensors.

At block 402, the electronic processor 205 determines a first visible light intensity for the subset of the plurality of reserved pixels covered by the integrated infrared cut-off filter 306. As used herein, the term "subset" refers to some quantity less than the full quantity (i.e., less than all) of the plurality of reserved pixels 304. For example, the electronic processor 205 may analyze the output for one or more of the reserved pixels covered by the integrated infrared cut-off filter 306 using digital signal processing or another suitable means to determine a value for the intensity of the visible light received by the reserved pixels. As described below, the electronic processor 205 controls the image sensor to operate in either the day mode or the night mode, based on the first visible light intensity.

At block 404, the electronic processor 205 compares the first visible light intensity to a visible light intensity threshold. In one example, the visible light intensity threshold represents the amount of visible light required to capture images at a desired quality level while in day mode.

When, at block 406, the first visible light intensity exceeds the visible light intensity threshold, the electronic processor 205 (at block 408) controls the image sensor 102 to operate in a day mode. For example, the electronic processor 205 may activate a circuit of the image sensor 102. In some instances, the day and night modes refer to how the electronic processor 205 processes the image data received from the image sensor 102.

When, at block 406, the first visible light intensity does not exceed the visible light intensity threshold, the electronic processor 205 (at block 410) controls the image sensor to operate in a night mode.

As illustrated in FIG. 4, in some aspects, regardless of the mode, the controller 110 iterates the method 400 to determine when to switch modes.

In some instances, the electronic processor 205 controls, based on the first visible light intensity, the infrared transmitter 106. For example, the electronic processor 205 may deactivate the infrared transmitter when the first visible light intensity exceeds the visible light intensity threshold and activate the infrared transmitter when the first visible light intensity does not exceed the visible light intensity threshold.

In some instances, the electronic processor 205 controls the deployable infrared cut-off filter 108 based on the first visible light intensity. For example, the electronic processor 205 may control the deployable infrared cut-off filter to uncover the image sensor when the first visible light intensity does not exceed the visible light intensity threshold and control the deployable infrared cut-off filter to cover the image sensor when the first visible light intensity exceeds the visible light intensity threshold.

In some instances, the electronic processor 205 determines a second visible light intensity for the plurality of image recording pixels (e.g., by reading values for one or more of the pixels of the image recording area 302) and controls the image sensor to operate in one of a day mode and a night mode based on the first visible light intensity and the second visible light intensity.

In some instances, the electronic processor 205 may determining a difference between the first visible light intensity and the second visible light intensity. In such instances, the electronic processor 205 may compare the difference to a visible light intensity threshold, controlling the image sensor to operate in a day mode when the difference exceeds the visible light intensity threshold, and controlling the image sensor to operate in a night mode when the difference does not exceed the visible light intensity threshold.

In another example, the electronic processor 205 may compare the first visible light intensity to a visible light intensity threshold and compare the second visible light intensity to the visible light intensity threshold. In this example, the electronic processor 205 may control the image sensor to operate in a day mode when the first visible light intensity and the second visible light intensity exceed the visible light intensity threshold and control the image sensor to operate in a night mode when the first visible light intensity and the second visible light intensity do not exceed the visible light intensity threshold.

Figure 5:
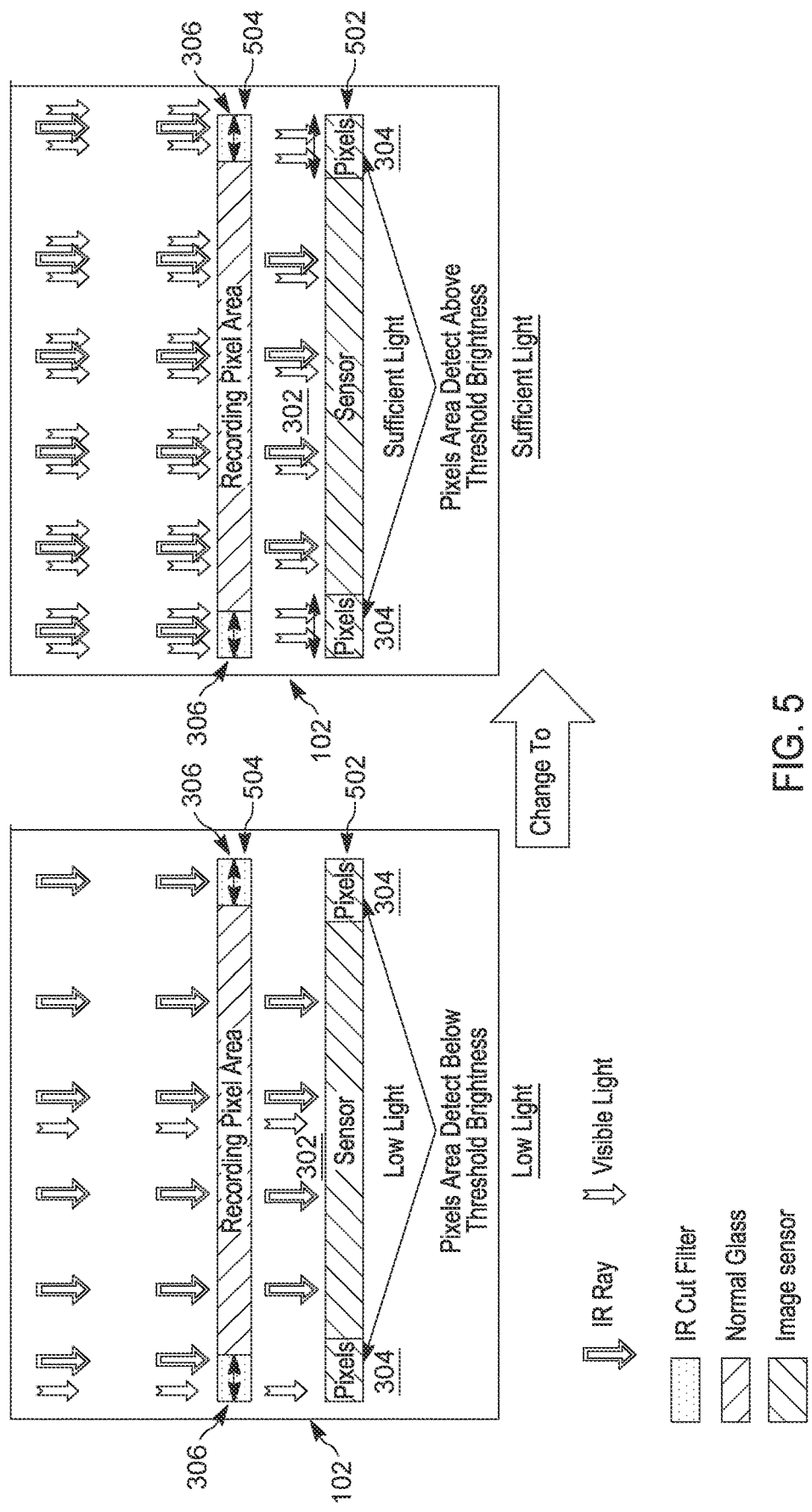
FIG. 5 is a diagram illustrating aspects of the execution of the method of FIG. 4 in accordance with some examples.

FIG. 5 illustrates an example of the image sensor 102 in operation. The instance of the image sensor 102 illustrated in FIG. 5 includes a sensing section 502 and a glass layer 504, which is positioned in front of the sensor (i.e., between the light sensing pixels of the sensor and the lens of the camera). In this example, the integrated infrared cut-off filter 306 is a film, with infrared light rejection properties, which is affixed to the glass layer 504. As illustrated in FIG. 5. IR rays are blocked from reaching the reserved pixels of the sensor, while visible light is allowed to pass through to all pixels.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about." or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An imaging system comprising:
an image sensor including a plurality of image recording pixels and a plurality of reserved pixels, wherein a subset of the plurality of reserved pixels are covered by an infrared cut-off filter;
an electronic processor coupled to the image sensor and configured to:
determine a first visible light intensity for the subset of the plurality of reserved pixels;
determine a second visible light intensity for the plurality of image recording pixels; and
control the image sensor to operate in one of a day mode and a night mode by:
determining a difference between the first visible light intensity and the second visible light intensity;
comparing the difference to a visible light intensity threshold;
controlling the image sensor to operate in a day mode when the difference exceeds the visible light intensity threshold; and
controlling the image sensor to operate in a night mode when the difference does not exceed the visible light intensity threshold.

2. The imaging system of claim 1, wherein the electronic processor is further configured to:
compare the first visible light intensity to a visible light intensity threshold; and
control the image sensor to operate in one of a day mode and a night mode by:
controlling the image sensor to operate in a day mode when the first visible light intensity exceeds the visible light intensity threshold; and
controlling the image sensor to operate in a night mode when the first visible light intensity does not exceed the visible light intensity threshold.

3. The imaging system of claim 2, further comprising:
an infrared transmitter positioned to illuminate, with infrared light, an area sensed by the image sensor; and
wherein the electronic processor is coupled to the infrared transmitter and is further configured to:
deactivate the infrared transmitter when the first visible light intensity exceeds the visible light intensity threshold; and
activate the infrared transmitter when the first visible light intensity does not exceed the visible light intensity threshold.

4. The imaging system of claim 2, further comprising:
a deployable infrared cut-off filter positionable between a first position, in which the deployable infrared cut-off filter covers the image sensor and a second position, in which the deployable infrared cut-off filter does not cover the image sensor;
wherein the electronic processor is coupled to the deployable infrared cut-off filter and further configured to:
control the deployable infrared cut-off filter to move into or stay in the first position when the first visible light intensity exceeds the visible light intensity threshold; and
control the deployable infrared cut-off filter to move into or stay in the second position when the first visible light intensity does not exceed the visible light intensity threshold.

5. The imaging system of claim 1, wherein the electronic processor is further configured to:
compare the first visible light intensity to a visible light intensity threshold;
compare the second visible light intensity to the visible light intensity threshold; and
control the image sensor to operate in one of a day mode and a night mode by:
controlling the image sensor to operate in a day mode when the first visible light intensity and the second visible light intensity exceed the visible light intensity threshold; and
controlling the image sensor to operate in a night mode when the first visible light intensity and the second visible light intensity do not exceed the visible light intensity threshold.

6. The imaging system of claim 1, further comprising:
a glass layer positioned in front of the image sensor;
wherein the infrared cut-off filter is a film affixed to the glass layer, and
wherein the film has infrared rejection properties.

7. The imaging system of claim 1, wherein the electronic processor is further configured to use for color correction of the plurality of reserved pixels not comprising the subset.

8. The imaging system of claim 1, wherein the plurality of reserved pixels does not overlap the plurality of image recording pixels.

9. The imaging system of claim 1, wherein the image sensor is a CMOS sensor.

10. A method comprising:
determining a first visible light intensity for a subset of a plurality of reserved pixels of an image sensor, the subset of the plurality of reserved pixels being covered by an infrared cut-off filter;
determining a second visible light intensity for a plurality of image recording pixels; and
controlling the image sensor to operate in one of a day mode and a night mode by:
determining a difference between the first visible light intensity and the second visible light intensity;
comparing the difference to a visible light intensity threshold;
controlling the image sensor to operate in a day mode when the difference exceeds the visible light intensity threshold; and
controlling the image sensor to operate in a night mode when the difference does not exceed the visible light intensity threshold.

11. The method of claim 10, further comprising:
comparing the first visible light intensity to a visible light intensity threshold;
wherein controlling the image sensor to operate in one of a day mode and a night mode includes:
controlling the image sensor to operate in a day mode when the first visible light intensity exceeds the visible light intensity threshold; and
controlling the image sensor to operate in a night mode when the first visible light intensity does not exceed the visible light intensity threshold.

12. The method of claim 10, further comprising:
controlling, based on the first visible light intensity an infrared transmitter positioned to illuminate, with infrared light, an area sensed by the image sensor.

13. The method of claim 12, further comprising:
deactivating the infrared transmitter when the first visible light intensity exceeds the visible light intensity threshold; and
activating the infrared transmitter when the first visible light intensity does not exceed the visible light intensity threshold.

14. The method of claim 10, further comprising:
controlling a deployable infrared cut-off filter based on the first visible light intensity.

15. The method of claim 14, further comprising:
controlling the deployable infrared cut-off filter to uncover the image sensor when the first visible light intensity does not exceed the visible light intensity threshold; and
controlling the deployable infrared cut-off filter to cover the image sensor when the first visible light intensity exceeds a visible light intensity threshold.

16. The method of claim 10, further comprising:
comparing the first visible light intensity to a visible light intensity threshold; and
comparing the second visible light intensity to the visible light intensity threshold;
wherein controlling the image sensor to operate in one of a day mode and a night mode includes:
controlling the image sensor to operate in a day mode when the first visible light intensity and the second visible light intensity exceed the visible light intensity threshold; and
controlling the image sensor to operate in a night mode when the first visible light intensity and the second visible light intensity do not exceed the visible light intensity threshold.

\* \* \* \* \*